(12) United States Patent
Chan et al.

(10) Patent No.: US 7,246,120 B2
(45) Date of Patent: Jul. 17, 2007

(54) TECHNIQUES FOR ACHIEVING HIGHER AVAILABILITY OF RESOURCES DURING RECONFIGURATION OF A CLUSTER

(75) Inventors: Wilson Wai Shun Chan, San Mateo, CA (US); Tolga Yurek, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 487 days.

(21) Appl. No.: 10/866,334

(22) Filed: Jun. 10, 2004

(65) Prior Publication Data
US 2004/0243578 A1      Dec. 2, 2004

Related U.S. Application Data

(63) Continuation-in-part of application No. 09/493,673, filed on Jan. 28, 2000, now Pat. No. 6,920,454.

(51) Int. Cl.
G06F 17/30        (2006.01)
(52) U.S. Cl. .............................................. 707/8; 707/10
(58) Field of Classification Search ...................... None
See application file for complete search history.

(56) References Cited

U.S. PATENT DOCUMENTS

| 5,060,144 A | 10/1991 | Sipple et al. |
| 5,161,227 A | 11/1992 | Dias et al. |
| 5,202,971 A | 4/1993 | Henson et al. |
| 5,287,521 A | 2/1994 | Nitta et al. |
| 5,403,639 A | 4/1995 | Belsan et al. |
| 5,408,653 A | 4/1995 | Josten et al. |
| 5,452,447 A | 9/1995 | Nelson et al. |
| 5,551,046 A | 8/1996 | Mohan et al. |
| 5,612,865 A | 3/1997 | Dasgupta |
| 5,892,945 A | 4/1999 | Mirchandaney et al. |
| 5,893,086 A | 4/1999 | Schmuck et al. |
| 5,963,960 A | 10/1999 | Swart et al. |
| 5,963,963 A | 10/1999 | Schmuck et al. |
| 5,970,495 A | 10/1999 | Baru et al. |
| 5,999,712 A | 12/1999 | Moiin et al. |
| 6,023,706 A | 2/2000 | Schmuck et al. |

(Continued)

OTHER PUBLICATIONS

Mirchandaney, R., "Improving the Performance of DSM Systems via Compiler Involvement", Suupercomputing '94, Proceedings, pp. 763-772.

(Continued)

*Primary Examiner*—Hosain Alam
*Assistant Examiner*—Christopher J Raab
(74) *Attorney, Agent, or Firm*—Hickman Palermo Truong & Becker LLP

(57) ABSTRACT

Techniques are described for remastering shared resources among nodes in a cluster, while minimizing the number of resources that are unavailable for access ("frozen") during the remastering operation. Only the resources that are being remastered from one node to one or more other nodes are frozen, whereas the other resources that are not being remastered are not frozen and are, therefore, still accessible. For example, in the context of a database cluster, there is no longer a need to freeze the entire database during a reconfiguration remastering operation. Consequently, during the remastering operation requests for access to the resources that are not being remastered can be processed and locks granted thereon.

18 Claims, 2 Drawing Sheets

U.S. PATENT DOCUMENTS

| | | | |
|---|---|---|---|
| 6,026,293 | A | 2/2000 | Osborn |
| 6,026,394 | A | 2/2000 | Tsuchida et al. |
| 6,047,283 | A | 4/2000 | Braun |
| 6,052,697 | A | 4/2000 | Bennett et al. |
| 6,101,495 | A | 8/2000 | Tsuchida et al. |
| 6,144,983 | A | 11/2000 | Klots et al. |
| 6,173,313 | B1 | 1/2001 | Klots et al. |
| 6,185,601 | B1 | 2/2001 | Wolff |
| 6,209,074 | B1 | 3/2001 | Dell et al. |
| 6,249,879 | B1 | 6/2001 | Walker et al. |
| 6,292,795 | B1 | 9/2001 | Peters et al. |
| 6,363,396 | B1 | 3/2002 | Klots et al. |
| 6,401,110 | B1 | 6/2002 | Freitas et al. |
| 6,449,699 | B2 | 9/2002 | Franke et al. |
| 6,449,734 | B1 | 9/2002 | Shrivastava et al. |
| 6,453,404 | B1 | 9/2002 | Bereznyi et al. |
| 6,529,906 | B1 | 3/2003 | Chan |
| 6,751,616 | B1 | 6/2004 | Chan |
| 2003/0200398 | A1 | 10/2003 | Harris |
| 2004/0220933 | A1 | 11/2004 | Walker |
| 2005/0149540 | A1 | 7/2005 | Chan et al. |

OTHER PUBLICATIONS

Hauptmann S., Wasel J.: "*On-Line Maintenance with On-the-Fly Software Replacement,*" Proceedings of the Third International Conference on Configurable Distributed Systems, Annapolis, MD. May 6-8 1996, IEEE Computer Society Press, Los Alamitos, CA, p. 70-80, XP002134719.

Loomis, Mary E.S., ODBMS, "Object Locking", Mar./Apr. 1992, pp. 53-56.

Apple Computer, Inc., Apple Press, "OpenDoc Cookbook for the Mac OS", 1996, pp. 187-189.

Aldred, M., Gertner, I., McKellar, S., Encore Comput. Corp., Marlborough, MA, "A Distributed Lock Manager on Fault Tolerant MPP", 1995, pp. 134-136.

CORBAservices, "CORBAservices: Common Object Services Specification", Mar. 1995, pp. 7-1 to 7-14.

International Searching Authority, "Notification of Transmittal of the International Search Report and the Written Opinion of the International Searching Authority, or the Declaration," PCT/US2005/020076, dated Oct. 10, 2005, 13 pages.

Current Claims, PCT/US2005/020076, 3 pages.

European Patent Office, "Communication pursuant to Article 96(2) EPC," Dated Nov. 2, 2005, 6 pages.

Current Claims, EP 99 968 071.3, 8 pages.

TECHNIQUES FOR ACHIEVING HIGHER AVAILABILITY OF RESOURCES DURING RECONFIGURATION OF A CLUSTER

CROSS REFERENCE TO RELATED APPLICATIONS

This application is a continuation-in-part of and claims the benefit of priority from U.S. patent application Ser. No. 09/493,673 filed Jan. 28, 2000 now U.S. Pat. No. 6,920,454, entitled "Techniques for DLM Optimization with Transferring Lock Information"; the contents of which is incorporated by this reference in its entirety for all purposes as if fully set forth herein.

FIELD OF THE INVENTION

The present invention relates generally to clustered computing systems and, more specifically, to techniques for achieving higher availability of resources during reconfiguration of a cluster.

BACKGROUND OF THE INVENTION

A "cluster" is the result of "clustering" computing resources together in such a way that they behave like a single resource. Clustering is often used for purposes of parallel processing, load balancing and fault tolerance. One common example of a cluster is a set of computers, or "nodes", that are configured so that they behave like a single computer. Each computer in the cluster has shared access to a set of resources. A resource is, generally, any item that can be shared by the computers in the cluster. A common example of a resource is a block of memory in which information is stored. The block of memory may be part of a node in the cluster or may be external to the cluster, such as a database block.

A cluster comprises multiple nodes that each executes an instance of a server that each facilitates access to a shared set of resources on behalf of clients of the cluster. One example of a cluster is a database cluster. A database cluster comprises multiple nodes that each executes an instance of a database server that each facilitates access to a shared database. Among other functions of database management, a database server governs and facilitates access to the particular database by processing requests by clients to access data in the database.

Typically, resources are assigned to masters, where each master coordinates the sharing of the resources assigned to it. A single node is the master of a given shared resource. A master has a global view of the state of the shared resources that it masters at any given time and acts as a coordinator for access to the shared resource. For example, a master coordinates and is aware of which node is currently granted a lock on the shared resource (and what type of lock) and which nodes are queued to obtain a lock on the shared resource. Typically, the master's global view of the status of a shared resource is embodied in metadata associated with the resource.

Each shared resource is mapped to a master. Various mechanisms may be used to establish the resource-to-master mapping. Techniques for using hash tables to establish the resource-to-master mapping are described in detail, for example, in U.S. Pat. No. 6,363,396. The techniques described herein are not limited to any particular mechanism for establishing the resource-to-master mapping.

In order to ensure a balanced distribution of shared resource mastership among nodes in a cluster, resources should be remastered when a node membership change causes a reconfiguration in the cluster, such as when a node is added to or removed from a cluster. For example, if a node goes down and needs to be removed from the cluster, the resources that the node was mastering need to be remastered, i.e., the mastership of these resources needs to be redistributed to other nodes in the cluster. Likewise, if a node is added to the cluster, the new node should be assigned some resources to master, from the other nodes in the cluster. Resource remastering generally entails message exchanges among the nodes regarding which resources need to be remastered as a result of the cluster reconfiguration. Once these messages are exchanged and the resources for remastering are agreed upon by the nodes, resource remastering generally entails freezing access operations (e.g., granting locks) on the particular resources being remastered, while transferring the new resource-to-master mapping and transferring the global view of the state of the resources (e.g., metadata) being remastered from the source master node to the target master node. Resource remastering associated with a cluster reconfiguration operation typically results in a better performing system.

However, with past approaches to cluster reconfiguration, while a cluster is being reconfigured, all the shared resources associated with the cluster are left in an inconsistent state until the remastering operation is completed. Lock operations on any of the resources are not allowed while the resources are in this inconsistent state, which lasts until the remastering operation is completed. This constraint results in a total freezing of access to all the shared resources associated with the cluster. In the context of a database cluster, all the resources associated with the database, i.e., the database itself, are frozen during a reconfiguration remastering operation. Hence, there is room for improvement in making resources shared among nodes in a cluster available while the cluster is being reconfigured.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION OF EMBODIMENTS OF THE INVENTION

Figure 1:
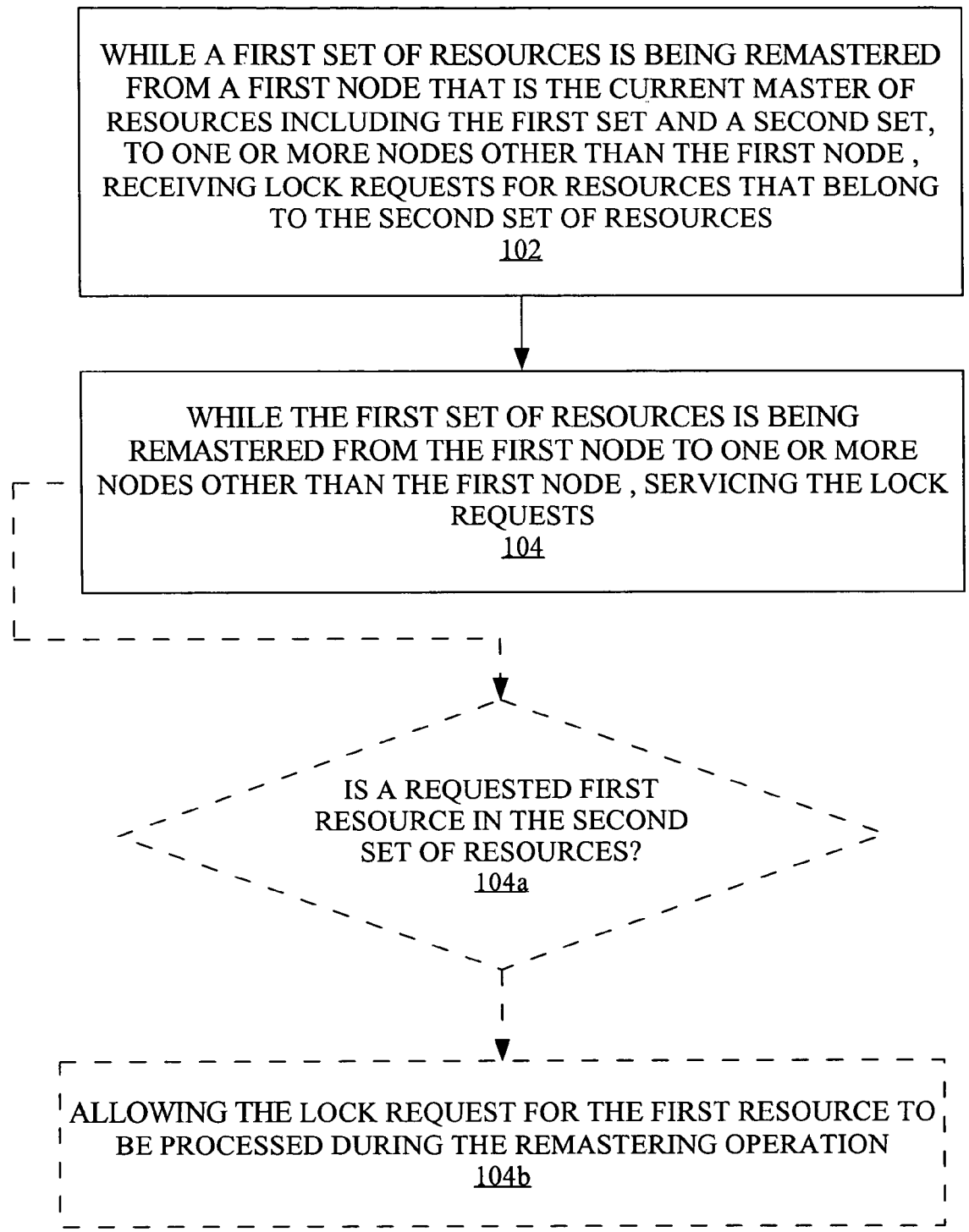
FIG. 1 is a flow diagram that illustrates a process for performing a remastering operation on resources in a cluster, according to an embodiment of the invention.

In the following description, for the purposes of explanation, numerous specific details are set forth in order to provide a thorough understanding of embodiments of the present invention. It will be apparent, however, that embodiments of the present invention may be practiced without these specific details. In other instances, well-known structures and devices are shown in block diagram form in order to avoid unnecessarily obscuring embodiments of the present invention.

Functional Overview of Embodiments

Techniques are described for remastering shared resources among nodes in a cluster, while minimizing the number of resources that are unavailable for access ("frozen") during the remastering operation. Only the resources that are being remastered from one node to one or more other nodes are frozen, whereas the other resources that are not being remastered are not frozen and are, therefore, still accessible. For example, in the context of a database cluster, there is no longer a need to freeze the entire database during a reconfiguration remastering operation. Consequently, during the remastering operation, requests for access to the resources that are not being remastered can be processed and locks granted thereon.

Operating Environment

An embodiment of the invention may be implemented in an operating environment referred to as a cluster. One type of cluster in which embodiments may be implemented is a database cluster. As previously described, a database cluster comprises multiple nodes that each executes an instance of a database server ("server") that each facilitates access to a shared database. Each node comprises a combination of computing hardware, such as computing system 200 of FIG. 2, and a server instance. Each server instance comprises a combination of integrated software components and an allocation of computational resources (such as memory and processes) for executing the integrated software components on one or more processors of a node, where the combination of the software and computational resources are used to manage a particular common database on behalf of clients of the cluster.

The operating environment includes clients that are communicatively coupled to the cluster of database servers. The database servers are communicatively coupled to the shared database. The clients are applications or programs that cause execution of processes on the database cluster via a network, for example. A client may execute, for non-limiting examples, on a desktop computer or on an application server.

In the context of a database cluster, the database is a repository for storing data and metadata on a persistent memory mechanism, such as a set of hard disks. Such data and metadata may be stored in the database logically, for example, according to relational database constructs, multidimensional database constructs, or a combination of relational and multidimensional database constructs. When a server accesses data from the shared database, it typically copies the data into the volatile memory of the node on which the server is executing. For example, the data is copied into the node's cache memory for manipulation purposes. Another server on another node may subsequently access the data, either from the other node's cache memory or from persistent storage, depending on the database architecture.

Remastering Resources During A Cluster Reconfiguration

Partial freezing of resources during reconfiguration of a cluster allows client processes to enter a critical section of the server, in which the process can modify resource and lock structures if a particular resource of interest is not being remastered during this reconfiguration. Other attempts to enter this critical section are blocked if the resource of interest is being remastered. In a database cluster context, the average freeze time experienced by clients while trying to access the database during a cluster reconfiguration is reduced by only barring access to a portion of the database as compared to past approaches in which the entire database is frozen. Hence, a client that is working on a database transaction that only accesses portions of the database that are not being remastered during a cluster reconfiguration will be immune from the freeze during the remastering phase, which typically constitutes a majority of the reconfiguration time.

FIG. 1 is a flow diagram that illustrates a process for performing a remastering operation on resources in a cluster, according to an embodiment of the invention. A server that is executing on a node of the cluster performs the process illustrated in FIG. 1, such as a database server. The technique embodied in the process is presented in the context of a cluster reconfiguration, however, implementation of the process is not limited to reconfiguration remastering because this process can be beneficial to any remastering operation. One approach to remastering resources among nodes in a cluster is described in U.S. patent application Ser. No. 10/832,527 entitled "TECHNIQUES FOR MULTIPLE WINDOW RESOURCE REMASTERING AMONG NODES OF A CLUSTER", the disclosure of which is incorporated by this reference in its entirety for all purposes as if fully set forth herein. However, embodiments of this invention are not limited to use of remastering techniques as described in the reference.

A first node in the cluster is the current master of resources that include a first set of resources and a second set of resources. While the first set of resources is undergoing a remastering operation from the first node to one or more nodes other than the first node, at block 102 lock requests are received for resources that belong to the second set of resources. A given lock request may come from a process executing on the first node, or may come from a process executing on another node in the cluster.

At block 104 the lock requests associated with the second set of resources are serviced, while the first set of resources is still undergoing the remastering operation. The process of servicing the lock request may use conventional lock management technology, which may vary from implementation to implementation. Servicing the lock requests includes allowing the requesting process to communicate with the lock management mechanism associated with the respective resource master(s), rather than blocking such an exchange. Servicing the lock requests may also include granting a lock on a resource from the second set of resources. Furthermore, servicing the lock requests may comprise (indicated by a dashed lines/blocks in FIG. 1), at block 104a, determining whether a requested resource is in the second set of resources and if it is, then allowing processing of the lock request for the requested resource during the remastering operation, block 104b.

As discussed, identification of the resources that are being remastered is provided to each node in the cluster as part of a remastering process through the exchange of messages among the nodes in the cluster. For example, upon a node terminating, another node may suggest to the other nodes a particular resource-to-master mapping for the resources being remastered from the terminating source node to one or more target nodes, based on execution of a hash function. The other nodes are supposed to agree to the new mapping, for example, based on an acknowledgement message. Similarly, upon a node initializing in the cluster, one of the nodes may suggest a particular resource-to-master mapping for the resources being remastered from the existing source nodes to the new target node, based on execution of the hash function, and the other nodes are supposed to agree to the new mapping.

Hence, all the nodes, when initially processing lock requests received from a local process for resources mastered by any node in the cluster, can determine whether or not a relevant resource is being remastered before further processing of the lock request. Further processing of the lock request may include (1) allowing the request to be forwarded to the master node, in situations in which the node is not the master of that resource; or (2) processing the lock request according to conventional lock management techniques, in situations in which the node is the master of that resource. Alternatively, a lock request for a resource that is not mastered locally may be forwarded to the relevant master node, where the determination is made as to whether or not the resource is being remastered.

One way to determine whether or not a resource is being remastered is similar to determining the master of a resource. In one embodiment, a resource identifier associated with a given resource is hashed to a hash bucket using a hash function. From information associated with that hash bucket to which the resource is hashed, the state of the resource is determined. For example, if there is an ongoing remastering operation that involves the resource, then the new master node is identified; and if there is no ongoing remastering operation that involves the resource, then the current master node is identified. The state of each respective resource is updated in response to a remastering operation involving the resource, and every server instance in the cluster has access to the same state of each resource.

Often, with past approaches to reconfiguration of a cluster, a process desiring a lock on a shared resource is required to monitor the reconfiguration operation, for example, by communicating with a reconfiguration coordinator process, and is required to wait until a response is received that indicates that the reconfiguration operation is complete. With the techniques described herein, the caller process that is requesting a lock does not have to wait for the reconfiguration operation to complete because it is allowed to access shared resources, during the reconfiguration operation, that are not being remastered as part of the reconfiguration operation.

For example, management of requests for locks on resources may involve enforcement of "gate" logic toward the beginning of every lock operation. At this gate, a caller process that is requesting a lock on a resource is required to provide the resource identifier, which is used to determine whether a lock operation is currently allowed for that particular resource (e.g., as described above). If the resource is being remastered, then the caller may get a return message that indicates that the lock operation is not currently allowed. Subsequently, the caller is able to again request a lock on the resource. Alternatively, the caller process may simply be stalled at the gate until the lock operation is allowed. Once remastering of the resource is complete, the gate allows the caller to continue with the lock operation. By contrast, if the resource is not being remastered when the caller arrives at the gate, then the caller is allowed to continue with the lock operation without interruption.

Hardware Overview

Figure 2:
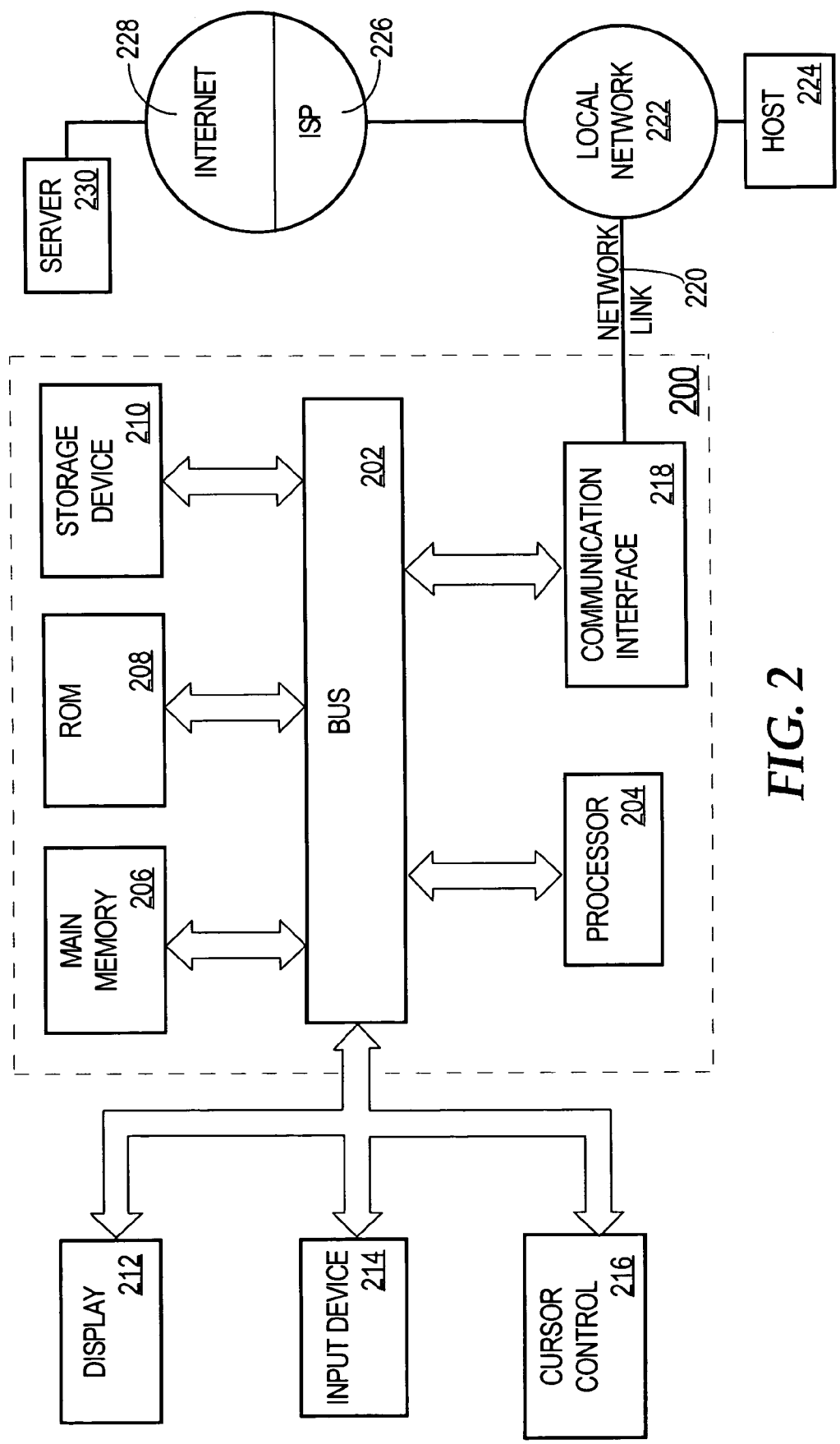
FIG. 2 is a block diagram that illustrates a computer system upon which an embodiment of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk, optical disk, or magneto-optical disk, is provided and coupled to bus 202 for storing information and instructions.

Computer system 200 may be coupled via bus 202 to a display 212, such as a cathode ray tube (CRT) or a liquid crystal display (LCD), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. In alternative embodiments, hardwired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. Such a medium may take many forms, including but not limited to, non-volatile media, volatile media, and transmission media. Non-volatile media includes, for example, optical, magnetic, or magneto-optical disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

Extensions and Alternatives

Alternative embodiments of the invention are described throughout the foregoing description, and in locations that best facilitate understanding the context of the embodiments. Furthermore, the invention has been described with reference to specific embodiments thereof. It will, however, be evident that various modifications and changes may be made thereto without departing from the broader spirit and scope of the invention. Therefore, the specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A method for performing a remastering operation on resources in a cluster having a plurality of nodes, wherein a first node is the current master of resources including a first set of resources and a second set of resources, the method comprising the computer-implemented steps of:

while said first set of resources is undergoing a remastering operation from mastership by said first node to mastership by one or more nodes other than said first node, said first node receiving lock requests for resources that belong to said second set of resources, and servicing said lock requests, wherein the step of servicing comprises granting a lock on a resource from said second set of resources.

2. The method of claim 1, wherein the step of servicing comprises in response to receiving a lock request for a first resource, determining whether said first resource is in said second set of resources.

3. The method of claim 2, wherein the step of servicing comprises if it is determined that said first resource is in said second set of resources, then allowing said lock request for said first resource to be processed during said remastering operation.

4. The method of claim 1, wherein the step of receiving comprises receiving a lock request from a process executing on said first node.

5. The method of claim 1, wherein the step of receiving comprises receiving a lock request from a process executing on a second node in said cluster other than said first node.

6. The method of claim 5, further comprising the computer-implemented step of:

submitting said lock request to said first node from said second node, without waiting for an indication that a cluster reconfiguration operation is complete.

7. The method of claim 1, wherein said remastering operation is associated with reconfiguring said cluster.

8. The method of claim 1, further comprising the computer-implemented step of:

providing to each node of said plurality of nodes, identification of said first set of resources to be remastered.

9. The method of claim 1, wherein the step of servicing comprises allowing processes from which the lock requests originated to communicate with a lock manager associated with the first node.

10. A computer-readable storage medium carrying one or more sequences of instructions which, when executed by one or more processors, causes the one or more processors to perform the method recited in claim 1.

11. A computer-readable storage medium carrying one or more sequences of instructions which, when executed by one or more processors, causes the one or more processors to perform the method recited in claim 2.

12. A computer-readable storage medium carrying one or more sequences of instructions which, when executed by one or more processors, causes the one or more processors to perform the method recited in claim 3.

13. A computer-readable storage medium carrying one or more sequences of instructions which, when executed by one or more processors, causes the one or more processors to perform the method recited in claim 4.

14. A computer-readable storage medium carrying one or more sequences of instructions which, when executed by one or more processors, causes the one or more processors to perform the method recited in claim 5.

15. A computer-readable storage medium carrying one or more sequences of instructions which, when executed by one or more processors, causes the one or more processors to perform the method recited in claim 6.

16. A computer-readable storage medium carrying one or more sequences of instructions which, when executed by one or more processors, causes the one or more processors to perform the method recited in claim 7.

17. A computer-readable storage medium carrying one or more sequences of instructions which, when executed by one or more processors, causes the one or more processors to perform the method recited in claim 8.

18. A computer-readable storage medium carrying one or more sequences of instructions which, when executed by one or more processors, causes the one or more processors to perform the method recited in claim 9.

* * * * *